United States Patent [19]

Uchida et al.

[11] Patent Number: 4,583,221
[45] Date of Patent: Apr. 15, 1986

[54] SYNCHRONIZATION SYSTEM FOR KEY TELEPHONE SYSTEM

[75] Inventors: Seiya Uchida, Akishima; Takao Ono, Tachikawa, both of Japan

[73] Assignee: Iwasaki Tsushinki K.K., Tokyo, Japan

[21] Appl. No.: 545,539

[22] Filed: Oct. 26, 1983

[30] Foreign Application Priority Data

Oct. 27, 1982 [JP] Japan ............................... 57-187524

[51] Int. Cl.$^4$ .............................................. H04J 3/06
[52] U.S. Cl. ..................................... 370/106; 370/100
[58] Field of Search ................. 370/29, 100; 375/114, 375/117; 179/90 K

[56] References Cited

U.S. PATENT DOCUMENTS 4,208,650 6/1980 Horn ................................... 375/117
4,225,960 9/1980 Masters ............................. 375/114

Primary Examiner—Douglas W. Olms
Assistant Examiner—Wellington Chin
Attorney, Agent, or Firm—Robert E. Burns; Emmanuel J. Lobato; Bruce L. Adams

[57] ABSTRACT

A synchronization system for a key telephone system, in which information signals are transmitted in a time-division manner between a key service unit and each key telephone set. The information signal is formed by a control signal, a first signal transmitted from the key service unit to the key telephone set and a second signal from the key telephone set to the key service unit. The control signal is formed by a start signal of one-pulse and a variable synchronizing code, which is placed in a time slot following the start signal and which is formed by a plurality of pulses assuming one of predetermined consecutive values in a predetermined order for each transmission frame period. The control signal is transmitted from the key service unit to each key telephone set for each frame period in synchronism with a first counter provided at the key service unit for developing standard of transmission timings. At the key telephone set, the detecting position of the variable synchronizing code in a next frame period performed under control of controlled standard timings, which are developed by a second counter provided at the key telephone set, is shifted by one pulse until a correct start signal is detected if the variable code is not correctly detected in a certain frame period. As a result of the above operations, the standard transmission timings and the controlled transmission timings are synchronized with each other.

2 Claims, 7 Drawing Figures

SYNCHRONIZATION SYSTEM FOR KEY TELEPHONE SYSTEM

BACKGROUND OF THE INVENTION

The present invention relates to a synchronizing system for signal pulses transmitted between a key service unit and a key telephone set in a key telephone system which is designed so that key information or the like is transmitted by a time division manner between the key service unit and the key telephone set.

A conventional synchronizing system employs a synchronizing signal channel separately provided of a data signal channel. Further, such a system has also been proposed that in case of using the same channel in common to the two kinds of signals, different codes are used for them, respectively. With the prior art systems, however, an extra cable pair is needed and, in case of multiplex transmission using the same cable, a MODEM or code detector is required, resulting in the defect of complex arrangements.

SUMMARY OF THE INVENTION

An object of the present invention is to provide a synchronizing system for a key telephone system which is adapted for obtaining synchronization of the transmission of information signals between the key service unit and each key telephone set through using a relatively simple arrangement.

The present invention will hereinafter be described in detail.

Of transmission signals between the key service unit and each key telephone set, a first signal from the key service unit to the key telephone set and a second signal from the latter to the former are divided in terms of time. Moreover, such a transmission format is formed in which the first signal is disposed in a time slot before or after the second signal, a one-pulse start signal is provided in the foremost time slot of each frame period and a variable synchronizing code is provided in the next time slot. The key service unit is provided with a first counter employed for developing standard transmission timing, a start signal generator and a variable synchronizing code generator, and each key telephone set is provided with a second counter employed for developing controlled transmission timing, a start signal detector and a variable synchronizing code detector. The second counter of the key telephone set is started by the abovesaid start signal and is operated so that variable synchronizing codes detected by the synchronizing code detector assume one of consecutive valves assigned in a predetermined order, whereby the controlled transmission timings are synchronized with the standard transmission timings developed by the first counter of the key service unit. To perform this, when the order of the variable synchronizing codes is not correct, the detection is delayed by the second counter to the time slot for one pulse in a just succeeding frame period until the start signal and the variable synchronizing code are correctly detected again.

For example, assuming that the variable synchronizing code is made up of three pulses and that the pulses are predetermined to change in an order of 0, 1, 2, ... 7, 0, 1, ..., even if data of the data pulse group are erroneously detected as the start signal and the variable synchronizing code during occurrence of out-of synchronization, the possibility of changing the variable synchronizing code to be detected in the next transmission period to data arranged in an order of 0, 1, 2, ... as compared with the contents of the variable synchronizing code of the previous frame period is very low. That is to say, the key service unit and the key telephone set are synchronized with each other by the combined use of the start signal and the variable synchronizing code as the data for detection of the synchronization.

BRIEF DESCRIPTION OF THE DRAWINGS

The present invention will be described in detail below with reference to the accompanying drawings, in which;

FIGS. 3(1) to 3(4) are shows timing charts explanatory of a step out;

DETAILED DESCRIPTION

Figure 1:
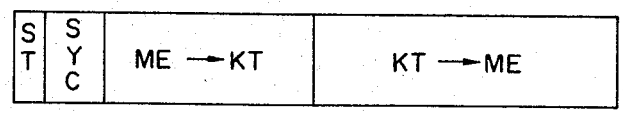
FIG. 1 is a diagram showing a transmission signal format for use in the present invention.

With reference to FIG. 1 showing a timing chart showing the format of a transmission signal transmitted between the key service unit and each key telephone set in accordance with the present invention, reference character ST indicates a one-pulse start signal; SYC designates an n-pulse variable synchronizing code; ME-KT identifies a data pulse group from the key service unit to each key telephone set; and KT-ME denotes a data pulse group from each key telephone set to the key service unit. The pulses have the same waveform; namely, they are of the same pulse width and of the same peak value.

Figure 2:
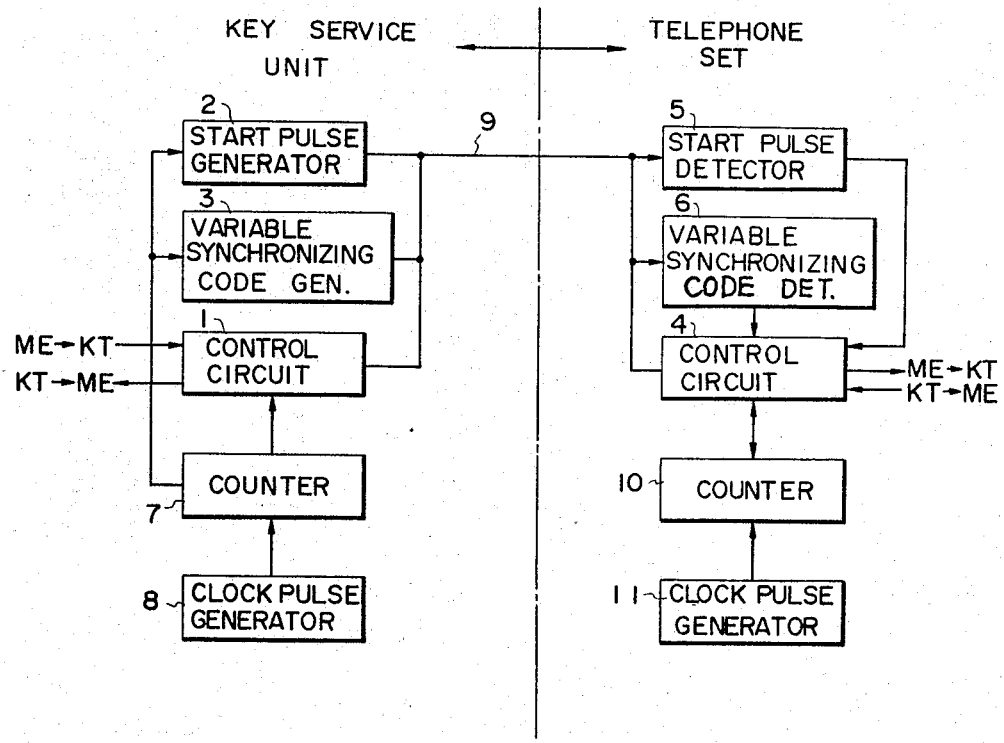
FIG. 2 is a diagram showing the basic arrangement of of the present invention.

FIG. 2 illustrates an example of the arrangement of the present invention. In FIG. 2, reference numeral 1 indicates a control circuit for controlling data transmission from the key service unit to the key telephone set; 2 designates a start pulse generator; 3 identifies a variable synchronizing code generator; 4 denotes a control circuit for controlling data transmission from the key telephone set to the key service unit and for controlling a counter 10 by the outputs of a start pulse detector 5 and a variable synchronizing code detector 6; 5 represents the start pulse detector; 6 shows the variable synchronizing code detector; 7 and 10 refer to counters; 8 and 11 signify clock pulse generators; and 9 indicates a cable.

Next, a description will be given of the operation of the circuit shown in FIG. 2. The counter 7 is driven by clock pulses from the clock pulse generator 8 to produce reference pulses which are employed as standard transmission timings. The reference pulses are applied to the start signal generator 2 to derive therefrom the start signal ST, which is transmitted via the cable 9 to the start signal detector 5 of the key telephone set and its output is applied to the control circuit 4 to start the counter 10. On the key service unit, upon occurrence of the start pulse ST, the variable synchronizing code generator 3 is started to transmit the n-pulse variable synchronizing code to the key telephone set. The variable synchronizing code detector 6 of the key telephone set receives the n pulses and compares the variable synchronizing code with that previously received and, if its contents assume correct values allocatted in a predetermined order, provides its output signal to the control circuit 4. After this, the control circuit 4 receives data from the key service unit. The control circuit 1 keeps on receiving data from the key telephone set after the data transmission to the key telephone set and, after a certain elapsed time, it returns to the operation of sending out the start pulse ST to repeat one frame of the data transmission. After transmission of data to the key service unit, the counter 10 is reset to put the key telephone set in a state ready for receiving the next start pulse.

Figures 3(1), 3(2), 3(3), 3(4):
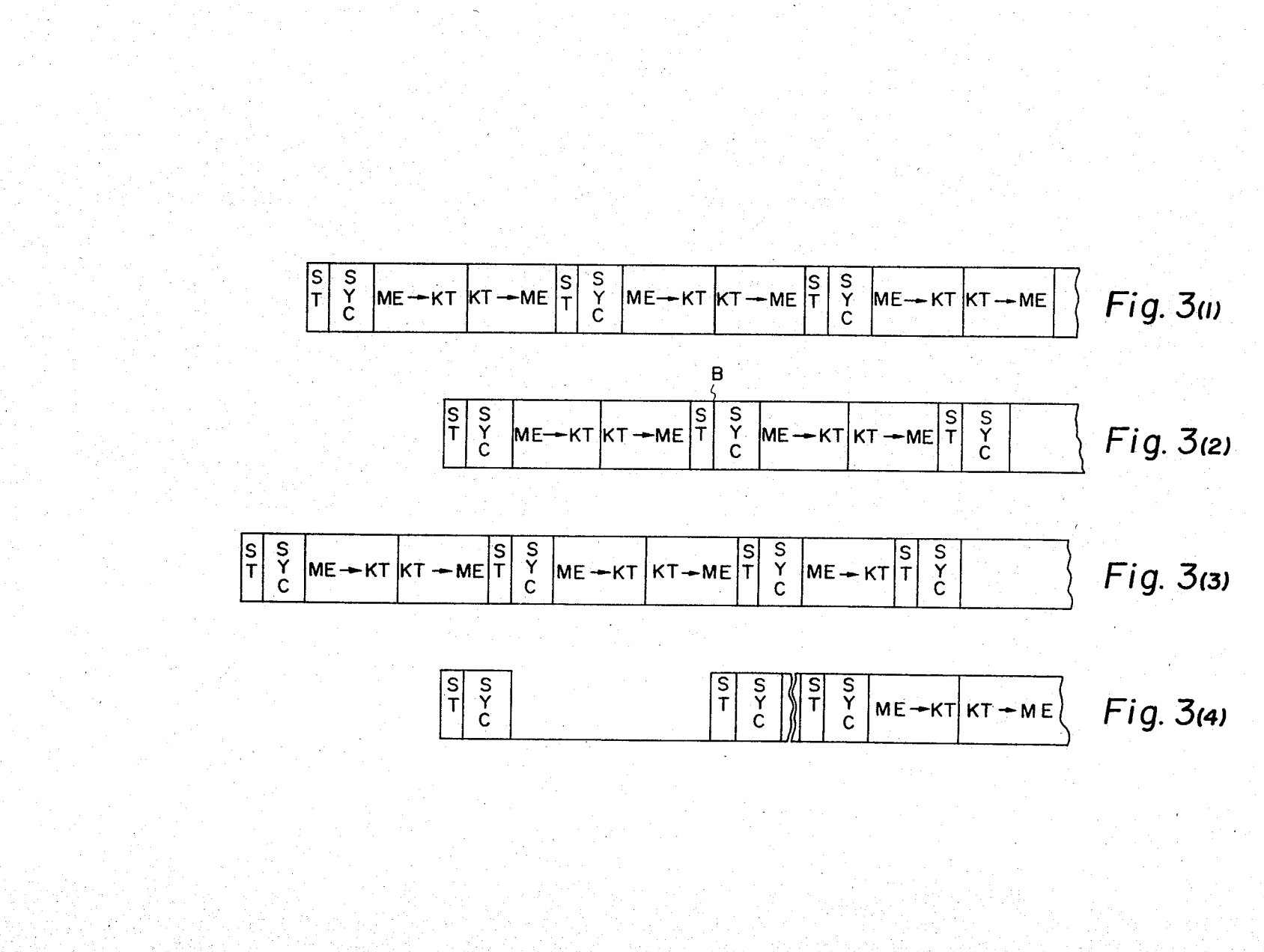

Now, a description will be given of an operation when out-of synchronization actually occurs in the arrangement of FIG. 2. Referring first to FIGS. 3(1) to 3(4) a description will be given of how out-of synchronization is caused. FIG. 3(1) is a timing chart showing that the circuit operates in a normal state; FIG. 3(2) is a timing chart showing an example of a circuit operation a little delayed relative to the normal operation in the case of FIG. 3(1); and FIG. 3(3) is a timing chart showing an example of a circuit operation a little advanced relative to the normal operation in the case of FIG. 3(1). Such out-of synchronization occurs, for instance, when the key telephone set is connected to its cable terminal in the state in which the power source is connected to the key service unit and the start signal is delivered at regular time intervals. That is, in the case of FIG. 3(2), the key telephone set is connected at the timing of the start signal ST and this timing corresponds to the time slot ME-KT in the normal state shown in FIG. 3(1) but since the data pulses are being delivered out from the key service unit, the key telephone set erroneously detects the data as the start signal ST and actuates the counter 10. This operation differs from that of the timing chart recognized by the key service unit, resulting in what is socalled out-of synchronization state to make normal transmission impossible.

With the arrangement of FIG. 2, this out-of synchronization can be corrected. That is, in the case of FIG. 3(2), when a pulse in the data pulse group has become the start signal ST, the next variable synchronizing code SYC is tested and if this code SYC is not correct, then the control circuit 4 finds out the correct start signal ST on the basis of a signal from the variable synchronizing code detector 6 in such a manner as follows: In a case where the data pulse has been erroneously detected as the start signal ST in the current frame period, the detecting operation is stopped until a point B in FIG. 3(2) corresponding to the time slot next to the mis-detected pulse in the next frame period and the next start signal detecting position is detected from the counter 10 so that the aforementioned operations are repeated to thereby find out the correct start signal ST. In other words, assuming that the number of pulses in one frame period is N and that the variable synchronizing code is formed by n-pulse, the start signal detecting position is repeatedly delayed by steps of N−n, by which synchronization is restored.

The case of FIG. 3(3) does not occur in practice. The start signal ST in this case becomes invalid in practice. Accordingly, in this case, the state of FIG. 3(1) is initially obtained so that synchronization is achieved.

Figure 4:
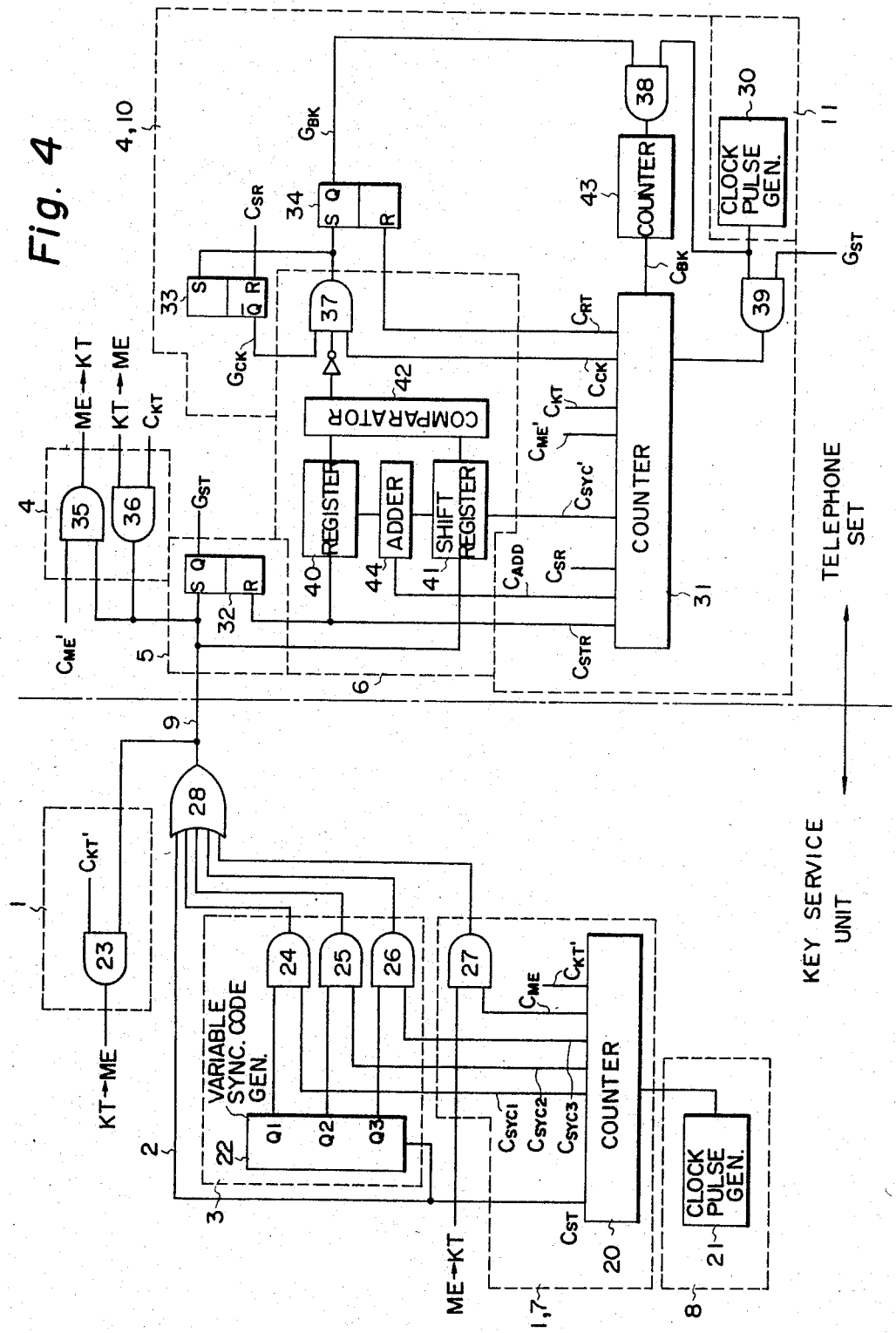
FIG. 4 is a block diagram illustrating an embodiment of the present invention.
Figure 5A:
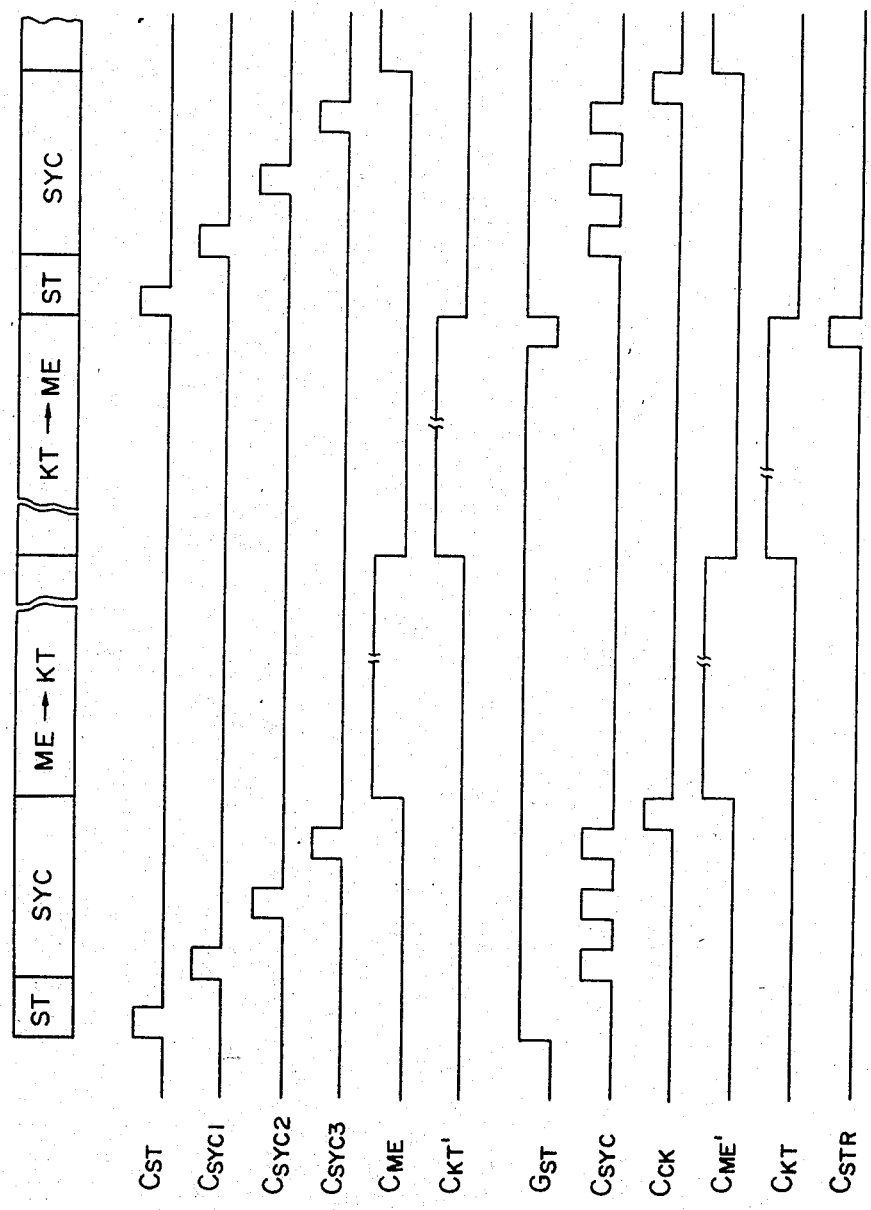
FIGS. 5A and 5B are timing charts expranatory of the operation of the circuit of FIG. 4 when it is in the normal state.
Figure 5B:
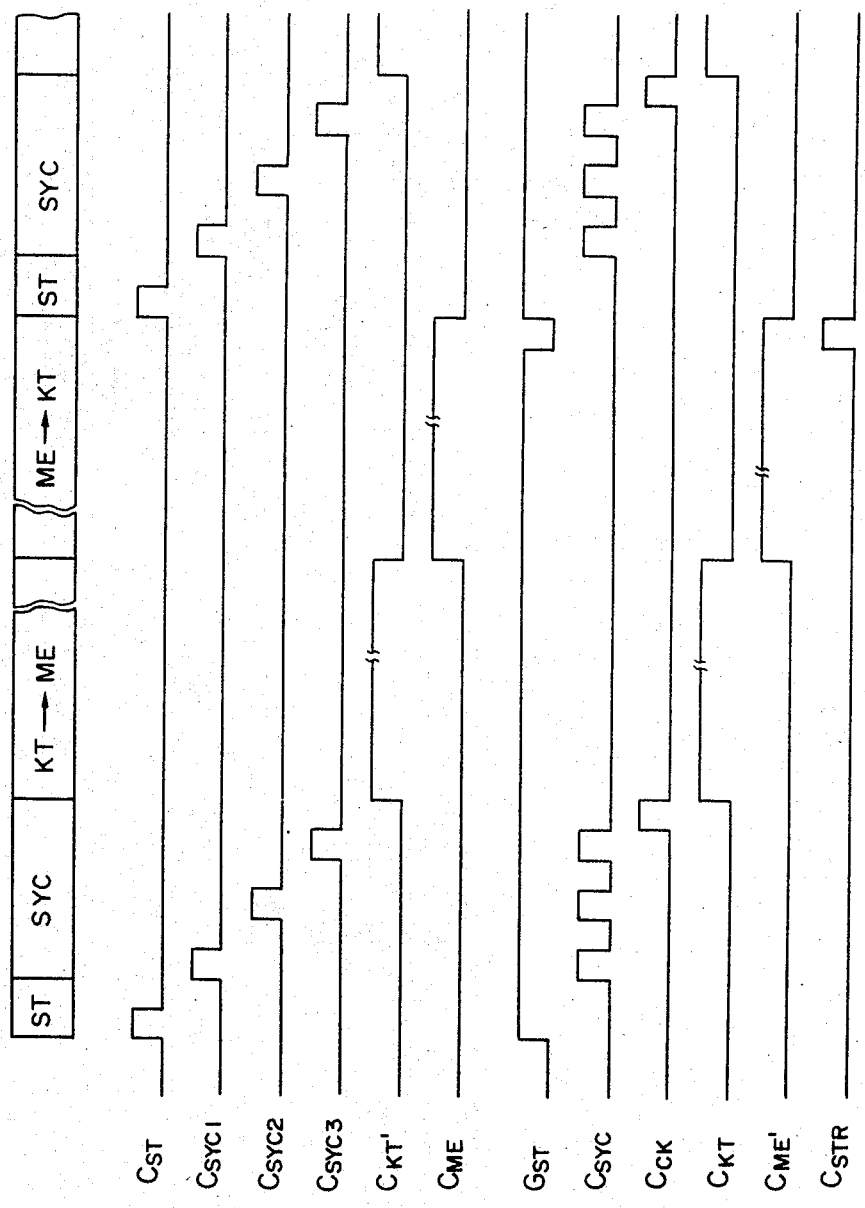

FIG. 4 illustrates an embodiment of the present invention in which the respective circuits shown in FIG. 2 are formed by hardware logic circuits as indicated by the broken lines, and FIGS. 5A and 5B are timing charts explanatory of the operation of the circuit shown in FIG. 4. For convenience of description, N represents the number of time slots in one transmission period and n represents the number of time slots of the variable synchronizing code, and let it be assumed that n is three and that pulses change in an order 0, 1, 2, ... 7, 0, 1, ... In FIG. 4 reference numerals 21 and 30 indicate clock pulse generators, 20 and 31 counters, 22 a variable synchronizing code generator formed by a three-bit binary counter, 23 to 27 and 35 to 39 AND gates, 28 an OR gate, 41 a shift register for receiving the three-bit variable synchronizing code, 44 an adder for adding "1" to the contents of the shift register 21, 40 a standby register for the contents of the shift register 41 added with "1" by the adder 44, 42 a comparator for comparing the contents of the registers 40 and 41 with each other, 32 to 34 flip-flops, and 43 a counter for shifting the start signal detecting position by a time corresponding to the number of time slots, N−n, when out of synchronization occurs.

The operation of the circuit shown in FIG. 4 is as follows: The counter 20 is formed by a ring counter and a simple gate circuit, and the counter 20, when supplied with a clock pulse from the clock pulse generator 21, generates an output to perform the operation of the timing chart shown in FIG. 5A. The output $C_{ST}$ of the counter 20 is applied to the variable synchronizing code generator 22 to add "1" to a variable synchronizing code transmitted in the previous period, preparing a variable synchronizing code to be delived following the start signal ST in the current period. Further, the output $C_{ST}$ is applied, as the start signal ST, via the OR gate 28 to a terminal S of the flip-flop 32 to set it and, by its output $G_{ST}$, the gate 39 is opened, through which clock pulses of the clock pulse generator 30 are applied to the counter 31 to start its operation. Next, the counter 20 provides outputs $C_{SYC1}$, $C_{SYC2}$ and $C_{SYC3}$, by which the gates 24, 25 and 26 are opened, through which the output of the variable synchronizing code generator 22 is applied to the OR gate 28. Further, the counter 20 provides an output $C_{ME}$ to open the gate 27, outputting the data ME-KT from the key service unit to the key telephone set. After the delivery of the data to the key telephone set, the counter 20 yields an output $C_{KT}$, to open the gate 23, through which is received the data KE-ME from the key telephone set. Thereafter, the output $C_{ST}$ is provided again, by which a start pulse ST is generated and "1" is added to the contents of the variable synchronizing code generator 22, thus repeating the preparation of the variable synchronizing code of the current period. At the key telephone set, after receiving the start signal, the shift register 41 receives the three bits of the variable synchronizing code while shifting them in a sequential order by an output $C_{SYC}$, of the counter 31. Next, an output $C_{ME}$, is provided from the counter 31 to open the gate 35, through which the data ME-KT from the key service unit is received. Further, an output $C_{KT}$ is provided from the counter 31 to open the gate 36, through which the data from the key telephone set is transmitted and, finally, an output $C_{ADD}$ is provided, by which the contents of the shift register 41 is incremented by one so that the contents of the shift register 41, that is, the variable synchronizing code received in the current period may be made equal to the variable synchronizing code to be received in the next period through using the adder 44, and the incremented contents are set in the standby register 40 by an output $C_{STR}$ of the counter 31. The output $C_{STR}$ resets the flip-flop 32 to make the key telephone set ready for the detection of the next start signal so that operations of the data transmission are repeated.

Figure 6:
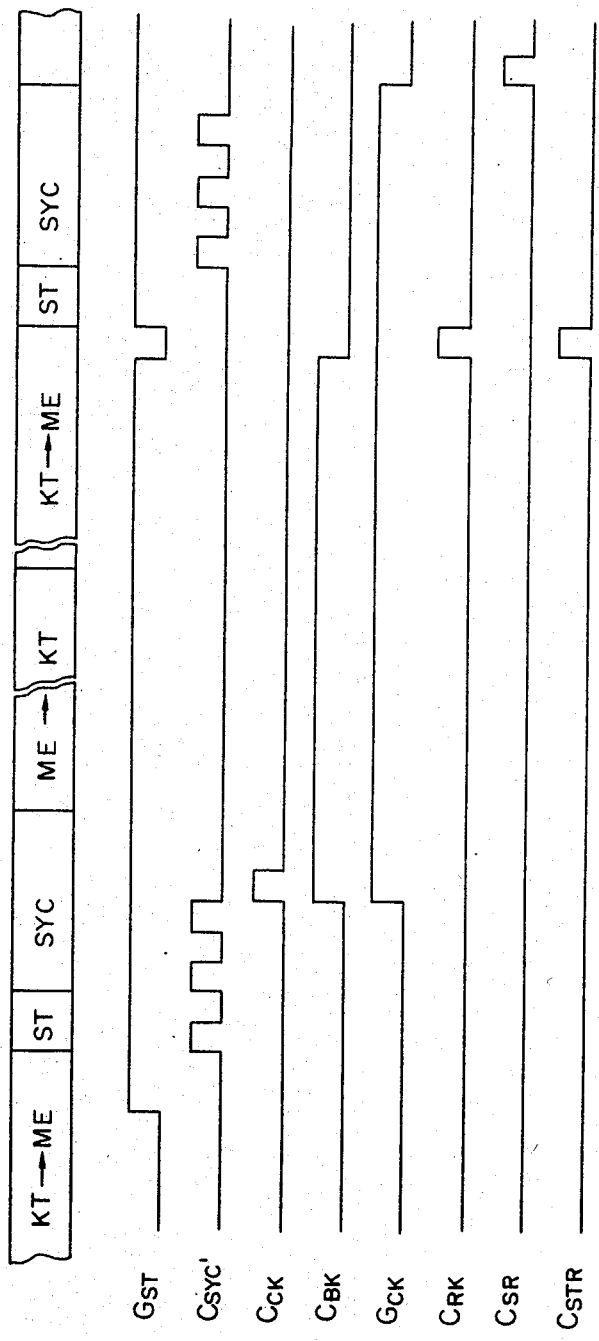
FIG. 6 is a timing chart showing the operation of the circuit of FIG. 4 when it is out-of synchronization.

The above is a description of the operation when the circuit is the normal state. Next, a description will be given of the circuit operation when the key service unit and the key telephone set are out-of synchronization. FIG. 6 shows a timing chart in the case of the out-of synchronization. The out-of synchronization is decided by testing the order of the pulses of the variable synchronizing codes for two periods. The register 40 stores therein the variable synchronizing code of the previous period incremented by one. That is, the contents of the register 40 are equal to the variable synchronizing code to be received in the current period. Then, after receiving the variable synchronizing code, it is tested by the comparator 42 at the output of the gate 37 whether the contents of the registers 40 and 41 are identical with each other and, if they are not identical, the flip-flops 33 and 34 are set. A signal from the thus set flip-flop 34 opens the gate 38 to start the counter 43 which counts the time corresponding to the number of time slots, N−n, and during the operation of the counter 43 a signal $C_{BK}$ is applied to the counter 31 to stop it from operation. Upon completion of the operation of the counter 43, the counter 31 provides outputs $C_{RT}$ and $C_{STR}$ to reset the flip-flops 32 and 34, putting the key telephone set again in the state ready for the next start signal detection. On the other hand, an output $\overline{Q}$ of the flip-flop 33 set by the output of the gate 37 closes the gate 37 so that the variable synchronizing code detected next may not be compared with the previous one. The reason is that in the case of out-of synchronization, the variable synchronizing code to be detected next is handled as a normal code. Thus, in such an out-of synchronization state, the start signal detecting position is shifted by the abovesaid operation to detect the position of a correct start signal, by which synchronization between the key service unit and the key telephone set can be maintained.

The foregoing description has been given in connection with the case where the first signal is placed before the second signal and when the second signal is placed before the first signal, the circuit arrangement used is such as shown in FIGS. 2 and 4, while the timing chart of the normal operation is such as shown in FIG. 5B and the timing chart in the case of out-of synchronization is such as shown in FIG. 6.

In the foregoing, the operation of the present invention has been described in terms of hardware logic but this is intended to facilitate the principle of the present invention, and the same operations can easily be achieved by program control through the use of a microcomputer or the like.

As has been described in the foregoing, in accordance with the present invention, the synchronization of transmission signals in the key telephone system can be effected without the necessity of such a complicated special arrangement as used in the prior art; accordingly, the present invention permits simplification of the apparatus, and hence is of great utility for packaging and for the reduction of costs.

What we claim is:

1. A synchronization system for a key telephone system in which information signals are transmitted in a time-division manner between a key service unit and each key telephone set, characterized in that the information signal is composed of a control signal of one-pulse start signal and a variable synchronizing code, which is placed in a time slot following the start signal and which is formed by a plurality of pulses assuming one of predetermined consecutive values in a predetermined order for each transmission frame period, a first signal to be transmitted from the key service unit to the key telephone set and a second signal to be transmitted from the key telephone set to the key service unit, the signal format of the information for each period being formed so that the control signal is followed by the first signal and the second signal allocated in a predetermined order;

that the key service unit is provided with a first counter employed for developing standard transmission timing, a first signal generator for generating the start signal and a second signal generator for generating the variable synchronizing code; and that each key telephone set is provided with a second counter for developing controlled transmission timing, a first detector for detecting the start signal under control of the controlled transmission timing, a second detector for detecting the variable synchronizing code under control of the controlled transmission timing, and control means for repeating operations of shifting by one pulse the detecting position of the variable synchronizing code by said second detector in a next period until a correct start signal and a correct synchronzing code are detected by said first detector and said second detector in combination if the variable synchronizing code is not correctly detected by said second detector in a certain frame period, whereby said first counter and said second counter are synchronized with each other, said second detector comprising a shift register for temporarily storing the variable synchronizing code of each frame period, an adder for adding by "1" to the contents of said shift register to produce an added output, a standby register for temporarily storing the added output until the added output is refreshed at the next frame period, and a comparator for comparing the contents of said shift register and the contents of said standby register when the variable synchronizing code is newly stored in said shift register in each of the periods to provide a coincident output as a correct detection output of the variable synchronizing code.

2. A synchronization system for a key telephone system in which information signals are transmitted in a time-division manner between a key service unit and each key telephone set, characterized in that the information signal is composed of a control signal of one-pulse start signal and a variable synchronizing code, which is placed in a time slot following the start signal and which is formed by a plurality of pulses assuming one of predetermined consecutive values in a predetermined order for each transmission frame period, a first signal to be transmitted from the key service unit to the key telephone set and a second signal to be transmitted from the key telephone set to the key service unit, the signal format of the information for each period being formed so that the control signal is followed by the first signal and the second signal allocated in a predetermined order;

that the key service unit is provided with a first counter employed for developing standard transmission timing, a first signal generator for generating the start signal and a second signal generator for generating the variable synchronizing code; and that each key telephone set is provided with a second counter for developing controlled transmission timing, a first detector for detecting the start signal under control of the controlled transmission timing, a second detector for detecting the variable synchronizing code under control of the controlled transmission timing, and control means for repeating operations of shifting by one pulse the detecting position of the variable synchronizing code by said second detector in a next period until a correct start signal and a correct synchronizing code are detected by said first detector and said second detector in combinatin if the variable synchronizing code is not correctly detected by said second detector in a certain frame period, whereby said first counter and said second counter are synchronized with each other, said control means comprises a scale of $(N-n)$ counter, where N is the number of pulses in each frame period and n is the number of pulses of the variable synchronizing code, to produce an output assuming a true state when counting its input pulses until a carry pulse is obtained from the scale of $(N-n)$ counter so that the counting operation of said second counter is temporarily stopped by the true state of the output on the scale of $(N-n)$ counter, and a gate for passing the input pulses of the scale of $(N-n)$ counter only a duration from a time when the variable synchronizing code is not correctly detected by said second detector to a time when the scale of $(N-n)$ counter generates the carry pulse.

* * * * *